United States Patent
Choi et al.

(10) Patent No.: US 9,099,756 B2
(45) Date of Patent: Aug. 4, 2015

(54) FLAME RETARDANT ELECTROLYTE FOR RECHARGEABLE LITHIUM BATTERY AND RECHARGEABLE LITHIUM BATTERY INCLUDING THE SAME

(75) Inventors: Nam-Soon Choi, Suwon-si (KR); Irina Profatilova, Suwon-si (KR); Sae-Weon Roh, Suwon-si (KR); Yong-Chul Park, Suwon-si (KR); Sung-Soo Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 702 days.

(21) Appl. No.: 12/582,668

(22) Filed: Oct. 20, 2009

(65) Prior Publication Data

US 2010/0209782 A1   Aug. 19, 2010

Related U.S. Application Data

(60) Provisional application No. 61/153,221, filed on Feb. 17, 2009.

(51) Int. Cl.

| | |
|---|---|
| *H01M 6/16* | (2006.01) |
| *H01M 10/04* | (2006.01) |
| *H01M 10/0567* | (2010.01) |
| *H01M 4/04* | (2006.01) |
| *H01M 4/13* | (2010.01) |

(Continued)

(52) U.S. Cl.
CPC ........ *H01M 10/0567* (2013.01); *H01M 4/0452* (2013.01); *H01M 4/0466* (2013.01); *H01M 4/13* (2013.01); *H01M 4/139* (2013.01); *H01M 4/62* (2013.01); *H01M 10/052* (2013.01); *H01M 10/0568* (2013.01); *H01M 10/0569* (2013.01); *H01M 10/4235* (2013.01); *H01M 4/133* (2013.01); *H01M 4/1393* (2013.01); *H01M 10/0525* (2013.01); *H01M 2300/0025* (2013.01); *H01M 2300/0045* (2013.01); *Y02E 60/122* (2013.01); *Y10T 29/49115* (2015.01)

(58) Field of Classification Search
USPC .......................................... 429/325, 326, 188
See application file for complete search history.

(56) References Cited

U.S. PATENT DOCUMENTS

| | | | |
|---|---|---|---|
| 6,379,846 B1 * | 4/2002 | Terahara et al. | 429/344 |
| 7,226,704 B2 | 6/2007 | Panitz et al. | |

(Continued)

FOREIGN PATENT DOCUMENTS

| | | |
|---|---|---|
| DE | 102 09 429 A1 | 9/2002 |
| EP | 2 151 882 A1 | 2/2010 |

(Continued)

OTHER PUBLICATIONS

European Search Report dated Apr. 28, 2010, for corresponding European Patent application 10153634.0, noting listed references in this IDS.

(Continued)

*Primary Examiner* — Ula C Ruddock
*Assistant Examiner* — Osei Amponsah
(74) *Attorney, Agent, or Firm* — Christie, Parker & Hale, LLP (57) ABSTRACT

Flame retardant electrolyte solutions for rechargeable lithium batteries and lithium batteries including the electrolyte solutions are provided. The flame retardant electrolyte solution includes a lithium salt, a linear carbonate-based solvent, at least one ammonium cation, a phosphoric acid-based solvent, and an additive including oxalatoborate.

20 Claims, 2 Drawing Sheets

(51) Int. Cl.

| | | |
|---|---|---|
| *H01M 4/139* | (2010.01) | |
| *H01M 4/62* | (2006.01) | |
| *H01M 10/052* | (2010.01) | |
| *H01M 10/0568* | (2010.01) | |
| *H01M 10/0569* | (2010.01) | |
| *H01M 10/42* | (2006.01) | |
| H01M 4/133 | (2010.01) | |
| H01M 4/1393 | (2010.01) | |
| H01M 10/0525 | (2010.01) | |

(56) References Cited

U.S. PATENT DOCUMENTS

| | | | | |
|---|---|---|---|---|
| 7,820,323 | B1* | 10/2010 | Zhang et al. | 429/188 |
| 2005/0164082 | A1* | 7/2005 | Kishi et al. | 429/188 |
| 2005/0233222 | A1 | 10/2005 | Yanagida et al. | |
| 2005/0277027 | A1* | 12/2005 | Kim et al. | 429/326 |
| 2006/0236528 | A1* | 10/2006 | Xu et al. | 29/623.1 |
| 2007/0026318 | A1 | 2/2007 | Kishi et al. | |
| 2007/0037064 | A1* | 2/2007 | Nishida et al. | 429/338 |
| 2007/0065728 | A1* | 3/2007 | Zhang et al. | 429/326 |
| 2007/0224515 | A1* | 9/2007 | Xu et al. | 429/326 |
| 2008/0026297 | A1* | 1/2008 | Chen et al. | 429/341 |
| 2008/0176141 | A1* | 7/2008 | Pan et al. | 429/325 |
| 2008/0286649 | A1* | 11/2008 | Li et al. | 429/188 |
| 2009/0305145 | A1* | 12/2009 | Kim et al. | 429/337 |

FOREIGN PATENT DOCUMENTS

| | | |
|---|---|---|
| JP | 2002-190316 | 7/2002 |
| JP | 2004-111349 | 4/2004 |
| JP | 2005-521257 A | 7/2005 |
| JP | 2005-243620 | 9/2005 |
| JP | 2005-259592 | 9/2005 |
| JP | 2007-035355 | 2/2007 |
| JP | 2007-234854 | 9/2007 |
| JP | 2007-250288 | 9/2007 |
| JP | 2007-305551 | 11/2007 |
| JP | 2007-538375 | 12/2007 |
| JP | 2008-034256 | 2/2008 |
| JP | 2008-108460 | 5/2008 |
| KR | 10-2005-0024270 | 3/2005 |

OTHER PUBLICATIONS

SIPO Office action dated Apr. 5, 2012, for corresponding Chinese Patent application 201010003004.7, (8 pages).

Japanese Office action dated Jul. 3, 2012, for corresponding Japanese Patent application 2010-010316, (2 pages).

Patent Abstracts of Japan and English machine translation of Japanese Publication 2004-111349 listed above, (17 pages).

Patent Abstracts of Japan and English machine translation of Japanese Publication 2007/035355 listed above, (18 pages).

Patent Abstracts of Japan and English machine translation of Japanese Publication 2007/250288 listed above, (11 pages).

KIPO Office Action dated Jul. 25, 2012 for corresponding Korean Patent Application No. 10-2012-0059321, 7 pages.

\* cited by examiner

FLAME RETARDANT ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of U.S. Provisional Application Ser. No. 61/153,221, filed on Feb. 17, 2009 and titled "FLAME RETARDANT ELECTROLYTE FOR RECHARGEABLE LITHIUM BATTERY AND RECHARGEABLE LITHIUM BATTERY INCLUDING THE SAME," the entire content of which is incorporated herein by reference.

BACKGROUND OF THE INVENTION

1. Field of the Invention

The invention is directed to flame retardant electrolyte solutions for rechargeable lithium batteries, and to rechargeable lithium batteries including the electrolyte solutions.

2. Description of the Related Art

Lithium rechargeable batteries have recently drawn attention as power sources for small, portable electronic devices. They use organic electrolyte solutions, yielding twice the discharge voltage of conventional batteries using alkali aqueous solutions. Accordingly, lithium rechargeable batteries have high energy density.

Lithium-transition element composite oxides capable of intercalating lithium (such as $LiCoO_2$, $LiMn_2O_4$, $LiNiO_2$, $LiNi_{1-x}Co_xO_2$ (0<x<1), and so on) have been used as the positive active materials of rechargeable lithium batteries.

Various carbon-based materials (such as artificial graphite, natural graphite, and hard carbon) capable of intercalating and deintercalating lithium ions have been used as the negative active materials for rechargeable lithium batteries.

A lithium salt dissolved in a carbonate-based solvent has been generally used as the electrolyte solution. Recently, in an effort to improve flame retardancy of the electrolyte solution, a mixture of cyclic and linear carbonate solvents and an additive amount of a phosphoric acid-based retardant has been suggested. However, the phosphoric acid-based retardant causes reductive decomposition during reaction of the negative electrode and the electrolyte solution, thereby decreasing the available capacity of the negative electrode and increasing cell resistance. As such, the phosphoric acid-based retardant suppresses the smooth intercalation of lithium ions.

Furthermore, if the phosphoric acid-based retardant is added in an excessive amount (i.e., in a solvent amount instead of in an additive amount), the cycle-life characteristics of the resulting battery is significantly decreased.

SUMMARY OF THE INVENTION

In one embodiment of the present invention, a flame retardant electrolyte solution for a rechargeable lithium battery has improved thermal stability, flame retardancy, and high rate and cycle-life characteristics.

In another embodiment of the present invention, a rechargeable lithium battery includes the flame retardant electrolyte solution for a rechargeable lithium battery.

According to one embodiment of the present invention, a flame retardant electrolyte solution for a rechargeable lithium battery includes a lithium salt, a linear carbonate-based solvent, at least one ammonium cation, a phosphoric acid-based solvent, and an additive including oxalatoborate.

Nonlimiting examples of suitable lithium salts include $LiPF_6$, $LiBF_4$, $LiSbF_6$, $LiAsF_6$, $LiCF_3SO_3$, $LiN(SO_2C_2F_6)_2$, $Li(CF_3SO_2)_2N$, $LiC_4F_9SO_3$, $LiB(C_6H_6)_4$, $LiClO_4$, $LiAlO_4$, $LiAlCl_4$, $LiN(C_xF_{2x+1}SO_2)(C_yF_{2y+1}SO_2)$ where x and y are natural numbers, LiCl, LiI, and combinations thereof.

Nonlimiting examples of suitable linear carbonate-based solvents include dimethylcarbonate (DMC), diethylcarbonate (DEC), ethylmethylcarbonate (EMC), and mixtures thereof. The linear carbonate-based solvent has a viscosity ranging from 0.4 to 1 cP.

Nonlimiting examples of suitable ammonium cations include N-included heterocyclic ions, such as pyridinium ions, pyridazinium ions, pyrimidinium ions, pyrazinium ions, imidazolium ions, pyrazolium ions, thiazolium ions, oxazolium ions, triazolium ions, and combinations thereof.

In one embodiment, for example, the at least one ammonium cation is selected from cations represented by the following Formulae 1 to 3, below.

Chemical Formula 1

In the above Formula 1, each of $R_1$ and $R_2$ is independently selected from substituted and unsubstituted alkyl groups, and substituted and unsubstituted alkoxy groups. $R_3$ is selected from hydrogen and substituted and unsubstituted alkyl groups. Also, m is 0 or 1, n is a positive number ranging from 1 to 4, and when n is 2 or greater, the respective $R_3$'s may be the same or different from each other.

Chemical Formula 2

In the above Formula 2, each of $R_5$ and $R_6$ is independently selected from substituted and unsubstituted alkyl groups, and substituted and unsubstituted alkoxy groups. $R_4$ is selected from hydrogen and substituted and unsubstituted alkyl groups. Also, n is a positive number ranging from 1 to 3, and when n is 2 or greater, the respective $R_4$'s may be the same or different from each other.

Chemical Formula 3

In the above Formula 3, each of $R_7$, $R_8$, $R_9$, and $R_{10}$ is independently selected from substituted and unsubstituted alkyl groups, and substituted and unsubstituted alkoxy groups.

In some embodiments, the at least one ammonium cation is provided in an ionic solution of anions and the ammonium cation(s). Nonlimiting examples of suitable anions for the ionic solution include $N(SO_2CH_3)_2^-$, $N(SO_2CF_2CF_3)_2^-$, $PF_6^-$, $BF_4^-$, and anions represented by Formulae 4 and 5, below.

Chemical Formula 4

Chemical Formula 5

Nonlimiting examples of suitable phosphoric acid-based solvents include phosphate compounds, phosphonate compounds, phosphazene compounds, and mixtures thereof.

The additive including oxalatoborate may be represented by the following Formula 6.

Chemical Formula 6

In the above Formula 6, each of $R_{11}$ and $R_{12}$ may be independently selected from halogens and halogenated C1 to C10 alkyl groups. Alternatively, both of $R_{11}$ and $R_{12}$ may be an —OCO— group, and $R_{11}$ and $R_{12}$ may be linked together to form a cyclic ring, yielding lithium bisoxalatoborate.

The flame retardant electrolyte solution may further include a fluorine-substituted carbonate-based solvent. Nonlimiting examples of suitable fluorine-substituted carbonate-based solvents include fluoroethylene carbonate, difluoroethylene carbonate, fluorodimethyl carbonate, fluoroethylmethyl carbonate, and mixtures thereof.

According to another embodiment of the present invention, a rechargeable lithium battery includes the flame retardant electrolyte solution.

In another embodiment, a rechargeable lithium battery includes a positive electrode, a negative electrode, a separator, an electrolyte, and an oxalatoborate-based additive or an oxalatoborate-based polymer. In this embodiment, the electrolyte may include at least one lithium salt, a linear carbonate-based solvent, at least one ammonium cation, and at least one phosphoric acid-based solvent.

By reducing or eliminating decomposition of the battery electrolyte solutions at high temperatures, the rechargeable lithium batteries according to embodiments of the present invention have improved thermal stability, flame retardancy, and electrochemical characteristics, such as high rate and cycle-life properties.

DETAILED DESCRIPTION OF THE EMBODIMENTS

As used herein, unless otherwise stated, the terms "alkyl" and "alkoxy" respectively refer to a C1 to C30 alkyl and a C1 to C30 alkoxy. Also, unless otherwise stated, the term "substituted" means that the structure is substituted with a substituent selected from C1 to C30 alkoxy groups and C1 to C30 carboxyl groups.

According to one embodiment of the present invention, a flame retardant electrolyte solution for a rechargeable lithium battery includes a lithium salt, a linear carbonate-based solvent, at least one ammonium cation, a phosphoric acid-based solvent, and an additive including oxalatoborate.

The lithium salt is dissolved in the non-aqueous organic solvent and supplies lithium ions to the battery. The lithium salt facilitates the basic operation of the rechargeable lithium battery, and facilitates transmission of lithium ions between the positive and negative electrodes. Nonlimiting examples of suitable lithium salts include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiB(C_6H_5)_4$, $LiClO_4$, $LiAlO_4$, $LiAlCl_4$, $LiN(C_xF_{2x+1}SO_2)(C_yF_{2y+1}SO_2)$ where x and y are natural numbers, LiCl, LiI, and combinations thereof.

The lithium salt may be present in a concentration ranging from about 0.1 to about 2.0M. Within this range, lithium ion conductivity and electrolyte performance are improved due to optimal viscosity.

The lithium salt may be present in an amount ranging from about 2 to about 30 wt % based on the total weight of the flame retardant electrolyte solution. In one embodiment, for example, the lithium salt may be present in an amount ranging from about 5 to about 20 wt %. Within these ranges, optimal ion conductivity of the flame retardant electrolyte solution may be obtained.

Previously, electrolyte solutions for rechargeable lithium batteries included mixed linear and cyclic carbonate-based solvents. However, in embodiments of the present invention, only a linear carbonate-based solvent is included in the electrolyte solution.

In order to improve the dissociation degree of the lithium salt and the mobility of dissociated lithium ions, a mixed solvent of a cyclic carbonate-based solvent (such as ethylene carbonate) and a linear carbonate-based solvent is generally used. However, the mixed solvent may produce gases at high temperatures, and lithium salts of the passivation film may be dissolved. In the electrolyte solutions according to embodiments of the present invention, the cyclic carbonate-based solvent is not used, and thus gas generation and collapse of the passivation film at high temperatures are substantially prevented, resulting in improved high rate and cycle-life characteristics at room temperature.

Nonlimiting examples of suitable linear carbonate-based solvents include dimethyl carbonate (DMC), diethyl carbonate (DEC), ethylmethyl carbonate (EMC), and mixtures thereof.

The linear carbonate-based solvent has a viscosity ranging from about 0.4 to about 1 cP (mPa·s). When the linear carbonate-based solvent has a viscosity within this range, high rate and cycle-life characteristics are improved.

The linear carbonate-based solvent may be present in an amount ranging from about 1 to about 90 wt % based on the total weight of the flame retardant electrolyte solution. In one embodiment, for example, the linear carbonate-based solvent may be present in an amount ranging from about 30 to about 80 wt %. In another embodiment, the linear carbonate-based solvent may be present in an amount ranging from about 40 to about 60 wt %. When the linear carbonate-based solvent is present in an amount within these ranges, viscosity increases in the flame retardant electrolyte solution are minimized, and the electrolyte has flame retardancy.

Nonlimiting examples of suitable ammonium cations include N-included heterocyclic ions, nonlimiting examples of which include pyridinium ions, pyridazinium ions, pyrimidinium ions, pyrazinium ions, imidazolium ions, pyrazolium ions, thiazolium ions, oxazolium ions, triazolium ions, and the like. Specific, nonlimiting examples of suitable ammonium cations include cations represented by the following Formulae 1 to 3.

Chemical Formula 1

In the above Formula 1, each of $R_1$ and $R_2$ is independently selected from substituted and unsubstituted alkyl groups, and substituted and unsubstituted alkoxy groups. $R_3$ is selected from hydrogen, and substituted and unsubstituted C1 to C7 alkyl groups. Also, m is 0 or 1, n is a positive number ranging from 1 to 4, and when n is 2 or greater, the respective $R_3$'s may be the same or different from each other. Here, the "substituted" means that the alkyl or alkoxy group is substituted with a substituent selected from C1 to C30 alkoxy groups and C1 to C30 carboxyl groups.

Chemical Formula 2

In the above Formula 2, each of $R_5$ and $R_6$ is independently selected from substituted and unsubstituted alkyl groups, and substituted and unsubstituted alkoxy groups. $R_4$ is selected from hydrogen, and substituted and unsubstituted C1 to C7 alkyl groups. Also, n is a positive number ranging from 1 to 3, and when n is 2 or greater, the respective $R_4$'s may be the same or different from each other. Here, "substituted" means that the alkyl or alkoxy groups is substituted with a substituent selected from C1 to C30 alkoxy groups and C1 to C30 carboxyl groups.

Chemical Formula 3

In the above Formula 3, each of $R_7$, $R_8$, $R_9$, and $R_{10}$ is independently selected from substituted and unsubstituted alkyl groups, and substituted and unsubstituted alkoxy groups. Here, "substituted" means that the alkyl or alkoxy group is substituted with a substituent selected from C1 to C30 alkoxy groups and C1 to C30 carboxyl groups.

In some embodiments, the ammonium cation(s) is provided in an ionic solution including anions and the ammonium cation(s). As used herein, the term "ionic solution" refers to a solution including only ions. The ionic solution is present in a liquid state at 100° C. or lower. An ionic solution that is present as a liquid at room temperature is referred to as a room temperature melted salt (or room temperature ionic solution).

The ionic solution includes the ammonium cation(s) and anions. Nonlimiting examples of suitable anions for the ionic solution include $N(SO_2CH_3)_2^-$, $N(SO_2CF_2CF_3)_2^-$, $PF_6^-$, $BF_4^-$, and anions represented by the following Formulae 4 and 5.

Chemical Formula 4

Chemical Formula 5

The ionic solution including ammonium cations has low volatility and thus inhibits increases in the internal pressure of the battery, which might be caused by gases from solvent volatilization and battery swelling.

The ionic solution including ammonium cations may be present in an amount ranging from about 1 to about 90 wt % based on the total weight of the flame retardant electrolyte solution. In one embodiment, for example, the solution is present in an amount ranging from about 20 to about 70 wt %. When the ionic solution including ammonium cations is present within these ranges, flame retardancy of the electrolyte solution may be maximized.

Nonlimiting examples of suitable phosphoric acid-based solvents include phosphate compounds, phosphonate compounds, phosphazene compounds, and mixtures thereof.

Nonlimiting examples of suitable phosphate compounds include trimethyl phosphate (TMP), triethyl phosphate (TEP), tripropyl phosphate (TPP), triphenyl phosphate (TPP), tricresyl phosphate (TCP), trixylenyl phosphate (TXP), and the like.

Nonlimiting examples of suitable phosphonate compounds include alkyl phosphonate compounds, such as dimethyl methylphosphonate (DMMP) and diethyl methylphosphonate (DEMP).

Nonlimiting examples of suitable phosphazene compounds include hexamethoxycyclotriphosphazene, fluorinated cyclotriphosphazene, and the like.

The phosphate, phosphonate, and phosphazene compounds may have a halogen substituent instead of hydrogen.

The phosphoric acid-based solvent selectively reacts with radicals such as R., H., and the like to prevent combustion of the electrolyte solution. Accordingly, a combustion decomposition reaction of the electrolyte solution caused by heat generated inside the battery may be suppressed.

The phosphoric acid-based solvent has a dielectric constant ranging from about 3 to about 20. When the phosphoric acid-based solvent has a dielectric constant within this range, ion-dipole interactions between oxygen having lone-pair electrons and lithium ions occur to enable dissociation of lithium salts.

The phosphoric acid-based solvent is present in an amount ranging from about 1 to about 90 wt % based on the total weight of the flame retardant electrolyte solution. In one embodiment, for example, the phosphoric acid-based solvent is present in an amount ranging from about 5 to about 30 wt %. When the phosphoric acid-based solvent is included within these ranges, flame retardancy or a self-extinguishing property of the electrolyte solution is obtained.

In some embodiments of the present invention, the flame retardant electrolyte solution may further include an additive including oxalatoborate. The additive including oxalatoborate is represented by the following Formula 6.

Chemical Formula 6

In the above Formula 6, each of $R_{11}$ and $R_{12}$ is independently selected from halogens, and halogenated C1 to C10 alkyl groups. Alternatively, both $R_{11}$ and $R_{12}$ are —OCO— groups, and $R_{11}$ and $R_{12}$ are linked together to form a second oxalatoborate cyclic ring with B, yielding lithium bisoxalatoborate.

Nonlimiting examples of suitable halogenated C1 to C10 alkyl groups include $CF_3$, $CF_2CF_3$, $CH_2CF_3$, $CFHCHF_2$, and the like.

Nonlimiting examples of suitable additives including oxalatoborate include $LiB(C_2O_4)_2$ (lithium bisoxalatoborate, LiBOB), $LiB(C_2O_4)F_2$ (lithium difluorooxalatoborate, LiFOB), and the like.

The additive including oxalatoborate is reductively decomposed at about 0.7 V (vs. Li/Li$^+$) or higher, and is oxidatively decomposed at about 5 V (vs. Li/Li$^+$) or higher during charging. As a result, a stable negative electrode coating is formed by removing the reductively decomposed ionic solution, thereby minimizing the thermo-decomposition between the fully charged negative electrode and the electrolyte solution, and maximizing the thermal stability and flame retardancy of the battery. The coating on the negative electrode is an oxalatoborate-based polymer and is derived from the oxalatoborate based additive. The oxalatoborate-based polymer coating is formed when the additive decomposes upon battery charging. In one embodiment, for example, the oxalatoborate based additive is lithium bisoxalatoborate, and the resulting coating on the negative electrode is represented by Chemical Formula 6A, below.

Chemical Formula 6A

The additive including oxalatoborate is present in an amount ranging from about 0.1 to about 5 wt % based on the total weight of the flame retardant electrolyte solution. In one embodiment, the additive is present in an amount ranging from about 0.5 to about 2 wt %. When the additive including oxalatoborate is present in an amount within these ranges, batteries having good thermal stability and flame retardancy may be obtained. While all of the additive may decompose to form the coating on the negative electrode upon charge, in some embodiments, some of the additive remains in the electrolyte solution. For example, when the additive is present in the electrolyte solution in an amount of about 2 wt % or greater, some additive will remain in the electrolyte solution after battery charging and forming the negative electrode coating. However, when the additive is present in the electrolyte solution in an amount of less than about 2 wt %, substantially no additive remains in the electrolyte solution.

The flame retardant electrolyte solution may further include a fluorine-substituted carbonate-based solvent. Nonlimiting examples of suitable fluorine-substituted carbonate-based solvents include fluoroethylene carbonate, difluoroethylene carbonate, fluorodimethyl carbonate, fluoroethylmethyl carbonate, and mixtures thereof.

The fluorine-substituted carbonate-based solvent has a HOMO (highest occupied molecular orbital) energy of about −12 eV or more, and a LUMO (lowest unoccupied molecular orbital) energy of about −0.5 to about −1 eV. In addition, the fluorine-substituted carbonate-based solvent is reductively decomposed at about 0.7 V (vs. Li/Li$^+$) or higher, and is oxidatively decomposed at about 5 V (vs. Li/Li$^+$) or higher during charge.

When added to the electrolyte solution, the fluorine-substituted carbonate-based solvent can form a structured coating without increasing viscosity, so as to effectively avoid exothermic reactions between the charged electrode active material and the electrolyte solution.

In addition, the fluorine-substituted carbonate-based solvent can provide electrochemical stability to the phosphoric acid-based solvent and the ionic solution including ammonium cations. The fluorine-substituted carbonate-based solvent having a low LUMO energy is decomposed before the phosphoric acid-based solvent and the ionic solution including ammonium cations are reductively decomposed at the interface between the negative electrode and the organic electrolyte solution, yielding a stable negative electrode coating. As such, reversible efficiency, capacity availability, and long cycle-life characteristics of the battery may be maximized.

In addition, the fluorine-substituted carbonate-based solvent can provide a solid electrolyte solution interface (SEI) passivation film that is stable on the negative electrode surface and has good oxidation resistance. Therefore, according to one embodiment of the present invention, a non-fluorinated cyclic carbonate-based solvent is not needed. The SEI formed from the fluorinated carbonate-based solvent is LiF.

The fluorine-substituted carbonate-based solvent may be added in an amount ranging from about 5 to 80 wt % based on the total weight of the flame retardant electrolyte solution. In one embodiment, for example, the fluorine-substituted carbonate-based solvent may be added in an amount ranging from about 10 to about 50 wt %. When the fluorine-substituted carbonate-based solvent is added in an amount within these ranges, it is possible to provide a SEI passivation film that is stable on the negative electrode surface and to minimize the amount of fluorinated carbonate-based solvent remaining in the electrolyte solution (i.e., the solvent that was not used to form the coating). Thereby, increases in inner cell pressure can be suppressed.

According to one embodiment, the flame retardant electrolyte solution has a viscosity of 5 cP or less. In another embodiment, the viscosity ranges from about 1 to about 3 cP. When the viscosity of the flame retardant electrolyte solution is within these ranges, increases in the viscosity of the flame retardant electrolyte solution can be suppressed, and the high-rate charge and discharge characteristics of the battery can be improved.

According to one embodiment of the present invention, the flame retardant electrolyte solution can improve electrochemical characteristics such as thermal stability, flame retardancy, high rate characteristics, and cycle-life retention characteristics by including a lithium salt, a linear carbonate-based solvent, at least one ammonium cation, a phosphoric acid-based solvent, an additive including oxalatoborate, and optionally a fluorine-substituted carbonate-based solvent. Such an electrolyte solution minimizes or avoids the thermodecomposition of a battery at high temperatures.

According to another embodiment of the present invention, a rechargeable lithium battery includes the flame retardant electrolyte solution. Rechargeable lithium batteries may be classified as lithium ion batteries, lithium ion polymer batteries, and lithium polymer batteries according to the presence of a separator and the kind of electrolyte used in the battery. Rechargeable lithium batteries may have a variety of shapes and sizes, and may include cylindrical, prismatic, or coin-type batteries. Rechargeable lithium batteries may be thin film batteries or may be rather bulky in size. Structures and fabricating methods for lithium ion batteries pertaining to the present invention are well known in the art.

In another embodiment, a rechargeable lithium battery includes a positive electrode, a negative electrode, a separator, an electrolyte, and an oxalatoborate-based additive or an oxalatoborate-based polymer. In this embodiment, the electrolyte may include at least one lithium salt, a linear carbonate-based solvent, at least one ammonium cation, and at least one phosphoric acid-based solvent.

Figure 1:
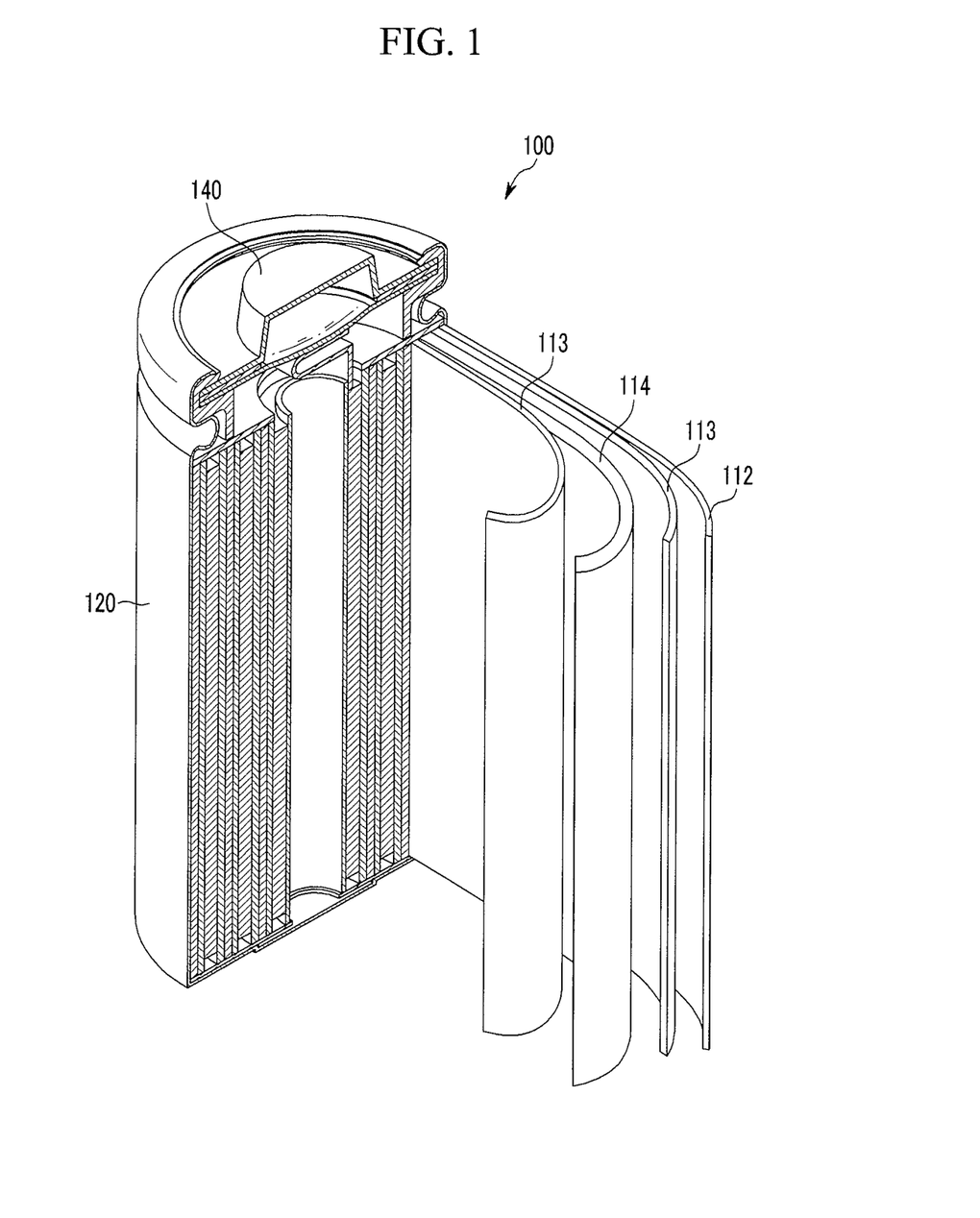
FIG. 1 is a perspective, cross-sectional view of a rechargeable lithium battery according to an embodiment of the present invention.

FIG. 1 is a perspective cross-sectional view of a rechargeable lithium battery according to one embodiment of the present invention. As shown in FIG. 1, a rechargeable lithium battery 100 includes a negative electrode 112, a positive electrode 114, a separator 113 interposed between the negative electrode 112 and the positive electrode 114, a flame retardant electrolyte solution (not shown) impregnating the separator 113, a battery case 120, and a sealing member 140 sealing the battery case 120. The negative electrode 112, positive electrode 114, and separator 113 are sequentially stacked, spirally wound, and placed in the battery case 120 to fabricate the rechargeable lithium battery 100.

The positive electrode 114 includes a current collector and a positive active material layer disposed on the current collector. The positive active material includes lithiated intercalation compounds that reversibly intercalate and deintercalate lithium ions. The positive active material may include a composite oxide including at least one element selected from cobalt, manganese, and nickel, as well as lithium. Nonlimiting examples of suitable positive active materials include those represented by the following Formulae 7 through 31:

$$Li_aA_{1-b}B_bD_2 \qquad (7)$$

In Formula 7, $0.90 \leq a \leq 1.8$ and $0 \leq b \leq 0.5$.

$$Li_aE_{1-b}B_bO_{2-c}D_c \qquad (8)$$

In Formula 8, $0.90 \leq a \leq 1.8$, $0 \leq b \leq 0.5$, and $0 \leq c \leq 0.05$.

$$LiE_{2-b}B_bO_{4-c}D_c \qquad (9)$$

In Formula 9, $0 \leq b \leq 0.5$ and $0 \leq c \leq 0.05$.

$$Li_aNi_{1-b-c}Co_bB_cD_\alpha \qquad (10)$$

In Formula 10, $0.90 \leq a \leq 1.8$, $0 \leq b \leq 0.5$, $0 \leq c \leq 0.05$, and $0 < \alpha \leq 2$.

$$Li_aNi_{1-b-c}Co_bB_cO_{2-\alpha}F_\alpha \qquad (11)$$

In Formula 11, $0.90 \leq a \leq 1.8$, $0 \leq b \leq 0.5$, $0 \leq c \leq 0.05$, and $0 < \alpha < 2$.

$$Li_aNi_{1-b-c}Co_bB_cO_{2-\alpha}F_2 \qquad (12)$$

In Formula 12, $0.90 \leq a \leq 1.8$, $0 \leq b \leq 0.5$, $0 \leq c \leq 0.05$, and $0 < \alpha < 2$.

$$Li_aNi_{1-b-c}Mn_bB_cD_\alpha \qquad (13)$$

In Formula 13, $0.90 \leq a \leq 1.8$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha \qquad (14)$$

In Formula 14, $0.90 \leq a \leq 1.8$, $0 \leq b \leq 0.5$, $0 \leq c \leq 0.05$, and $0 < \alpha < 2$.

$$Li_aNi_{1-b-c}Mn_bB_cO_{2-\alpha}F_2 \qquad (15)$$

In Formula 15, $0.90 \leq a \leq 1.8$, $0 \leq b \leq 0.5$, $0 \leq c \leq 0.05$, and $0 < \alpha < 2$.

$$Li_aNi_bE_cG_dO_2 \qquad (16)$$

In Formula 16, $0.90 \leq a \leq 1.8$, $0 \leq b \leq 0.9$, $0 \leq c \leq 0.5$, and $0.001 \leq d \leq 0.1$.

$$Li_aNi_bCo_cMn_dGeO_2 \qquad (17)$$

In Formula 17, $0.90 \leq a \leq 1.8$, $0 \leq b \leq 0.9$, $0 \leq c \leq 0.5$, $0 \leq d \leq 0.5$, and $0.001 \leq e \leq 0.1$.

$$Li_aNiG_bO_2 \qquad (18)$$

In Formula 18, $0.90 \leq a \leq 1.8$ and $0.001 \leq b \leq 0.1$.

$$Li_aCoG_bO_2 \qquad (19)$$

In Formula 19, $0.90 \leq a \leq 1.8$ and $0.001 \leq b \leq 0.1$.

$$Li_aMnG_bO_2 \qquad (20)$$

In Formula 20, $0.90 \leq a \leq 1.8$ and $0.001 \leq b \leq 0.1$.

$$Li_aMn_2G_bO_4 \qquad (21)$$

In Formula 20, $0.90 \leq a \leq 1.8$ and $0.001 \leq b \leq 0.1$.

$$QO_2 \qquad (22)$$

$$QS_2 \qquad (23)$$

$$LiQS_2 \qquad (24)$$

$$V_2O_5 \qquad (25)$$

$$LiV_2O_5 \qquad (26)$$

$$LiIO_2 \qquad (27)$$

$$LiNiVO_4 \qquad (28)$$

$$Li_{(3-f)}J_2(PO_4)_3 \qquad (29)$$

In Formula 29, $0 \leq f \leq 2$.

$$Li_{(3-f)}Fe_2(PO_4)_3 \qquad (30)$$

In Formula 30, $0 \leq f \leq 2$.

$$LiFePO_4 \qquad (31)$$

In Formulae 7 through 31, A is selected from Ni, Co, Mn, and combinations thereof. B is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. F is selected from F, S, P, and combinations thereof. G is selected from Al, Cr, Mn, Fe, Mg, La, Ce, Sr, V, and combinations thereof. Q is selected from Ti, Mo, Mn, and combinations thereof. I is selected from Cr, V, Fe, Sc, Y, and combinations thereof. J is selected from V, Cr, Mn, Co, Ni, Cu, and combinations thereof.

The positive active material compound can have a coating layer on its surface, or it can be mixed with a compound having a coating layer. The coating layer may include a coating element compound selected from oxides of coating elements, hydroxides of coating elements, oxyhydroxides of coating elements, oxycarbonates of coating elements, hydroxyl carbonates of coating elements, and combinations thereof. The compounds of the coating layer can be amorphous or crystalline. The coating element for the coating layer may include Mg, Al, Co, K, Na, Ca, Si, Ti, V, Sn, Ge, Ga, B, As, Zr, or mixtures thereof. The coating layer can be formed by any method that does not influence the properties of the positive active material by including the elements in the compound. For example, the method may include any coating method such as spray coating, dipping, and the like.

The positive active material may further include a conductive material. Any electrically conductive material may be used as the conductive material so long as it does not cause a chemical change. Nonlimiting examples of suitable conductive materials include natural graphite, artificial graphite, carbon black, acetylene black, ketjen black, carbon fibers, polyphenylene derivatives, and metal powders or metal fibers including copper, nickel, aluminum, silver, and so on. Combinations of conductive materials may also be used.

The positive active material may also include a binder. The binder improves the binding of the positive active material particles to each other and to the current collector. Nonlimiting examples of suitable binders include polyvinyl alcohol, carboxymethyl cellulose, hydroxypropyl cellulose, diacetyl cellulose, polyvinylchloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like. Combinations of binders may also be used.

The current collector may be Al, but is not limited thereto.

The negative electrode 112 includes a current collector and a negative active material layer disposed on the current collector. The negative active material layer includes a negative active material. Nonlimiting examples of suitable negative active materials include materials that reversibly intercalate/deintercalate lithium ions, lithium metal, lithium metal alloys, materials capable of doping lithium, and transition metal oxides.

The material that reversibly intercalates/deintercalates lithium ions may be a carbon material. The carbon material may be any carbon-based negative active material generally used in lithium ion rechargeable batteries. Nonlimiting examples of the carbon material include crystalline carbon, amorphous carbon, and mixtures thereof. The crystalline carbon may be non-shaped, or may be sheet-shaped, flake-shaped, spherical, or fiber-shaped natural or artificial graphite. The amorphous carbon may be soft carbon (e.g., carbon obtained by sintering at a low temperature), hard carbon (e.g., carbon obtained by sintering at a high temperature), mesophase pitch carbide, fired coke, and so on.

Nonlimiting examples of suitable lithium metal alloys include alloys containing lithium and one or more metals selected from Na, K, Rb, Cs, Fr, Be, Mg, Ca, Sr, Si, Sb, Pb, In, Zn, Ba, Ra, Ge, Al, and Sn.

Nonlimiting examples of suitable materials capable of doping lithium include Si, $SiO_x$ (0<x<2), Si—Y alloys (where Y is an element other than Si selected from alkali metals, alkaline-earth metals, group 13 elements, group 14 elements, transition elements, rare earth elements, and combinations thereof), Sn, $SnO_2$, Sn—Y (where Y is an element other than Sn selected from alkali metals, alkaline-earth metals, group 13 elements, group 14 elements, transition elements, rare earth elements, and combinations thereof), and mixtures thereof. At least one of these materials may be mixed with $SiO_2$. Nonlimiting examples of suitable elements for Y include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Nonlimiting examples of suitable transition metal oxides include vanadium oxide, lithium vanadium oxide, and the like.

The negative active material layer includes a binder, and optionally a conductive material. The binder improves binding of the negative active material particles to each other and to the current collector. Nonlimiting examples of the binder include polyvinyl alcohol, carboxymethyl cellulose, hydroxypropyl cellulose, polyvinyl chloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like. Combinations of binder materials may also be used.

Any electrically conductive material may be used as the conductive material so long as it does not cause a chemical change. Nonlimiting examples of the conductive material include natural graphite, artificial graphite, carbon black, acetylene black, ketjen black, carbon fibers, polyphenylene derivatives, and metal powders or metal fibers including copper, nickel, aluminum, silver, and so on. Combinations of conductive materials may also be used.

The current collector may be selected from copper foils, nickel foils, stainless steel foils, titanium foils, nickel foams, copper foams, polymer substrates coated with a conductive metal, and combinations thereof.

The negative electrode 112 and positive electrode 114 may each be fabricated by mixing the active material, conductive material, and binder together with a solvent to provide an active material composition, and coating the composition on a current collector. The solvent can be N-methylpyrrolidone, but it is not limited thereto. The electrode manufacturing method is well known.

The rechargeable lithium battery 100 includes the flame retardant electrolyte solution according to an embodiment of the present invention. The rechargeable lithium battery 100 may further include a separator 113 between the positive electrode and the negative electrode, as needed. The separator may include any material used in conventional lithium secondary batteries. Nonlimiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

The following examples are presented for illustrative purposes only, and do not limit the scope of the present invention.

EXAMPLES

Preparation of Flame Retardant Electrolyte Solution

Example 1

A flame retardant electrolyte solution was prepared with 9 wt % of $LiPF_6$ (1M concentration), 50 wt % of dimethyl carbonate (DMC), 20 wt % of an ionic solution including ammonium cations represented by the following Chemical Formula 32, 10 wt % of trimethyl phosphate (TMP), 1 wt % of LiFOB, and 10 wt % of fluoroethylene carbonate (FEC) 10 wt %.

Chemical Formula 32

Comparative Example 1

A flame retardant electrolyte solution was prepared as in Example 1, except that 10 wt % of LiPF$_6$ (1M concentration), 60 wt % of ethylene carbonate (EC) and dimethyl carbonate (DMC) mixed in a weight ratio of 3:7, and 30 wt % of an ionic solution including ammonium cations represented by Chemical Formula 32 were used.

Comparative Example 2

A flame retardant electrolyte solution was prepared as in Example 1, except that 10 wt % of LiPF$_6$ (1M concentration), 60 wt % of ethylene carbonate (EC) and dimethyl carbonate (DMC) mixed in a weight ratio of 3:7, and 30 wt % of trimethyl phosphate (TMP) were used.

Comparative Example 3

A flame retardant electrolyte solution was prepared as in Example 1, except that 10 wt % of LiPF$_6$ (1M concentration) and 90 wt % of ethylene carbonate (EC) and dimethyl carbonate (DMC) mixed at a weight ratio of 3:7 were used.

Comparative Example 4

A flame retardant electrolyte solution was prepared as in Example 1, except that the carbonate-based solvent was a mixture of ethylene carbonate (EC) and dimethyl carbonate (DMC) at a weight ratio of 3:7, instead of the single, dimethyl carbonate (DMC) solvent.

Experimental Example 1

Measuring Viscosity of Flame Retardant Electrolyte Solution

Each flame retardant electrolyte solution prepared according to Example 1 and Comparative Examples 1 to 4 was measured to determine the viscosity. The viscosity of each flame retardant electrolyte solution was measured with a rotary viscometer (digital) by monitoring a stress change depending upon frequency, and the viscosity was evaluated. The results are shown in Table 1, below.

Experimental Example 2

Measuring Retardancy of Flame Retardant Electrolyte Solution

Each flame retardant electrolyte solution prepared according to Example 1 and Comparative Examples 1 to 4 was measured to determine the retardancy. The retardancy of each flame retardant electrolyte solution was measured by the standard method of the UL 94 flammability test to determine the combustion degree through the flame combustion test. The flammability test was carried out by supporting 4 cm×1 cm glass fibers with 0.5 g of the electrolyte solution, contacting one end thereof with a flame source, observing whether or not it caught fire, and observing the duration of the fire to determine the retardancy of the flame retardant electrolyte solution.

TABLE 1

|  | Viscosity (cP) | Retardancy |
|---|---|---|
| Example 1 | 5 | Non-flammable |
| Comparative Example 1 | 3.2 | Very flammable |
| Comparative Example 2 | 3.4 | Self-extinguishable |
| Comparative Example 3 | 10.3 | Non-flammable |
| Comparative Example 4 | 5.6 | Non-flammable |

As shown in Table 1, the flame retardant electrolyte solution according to Example 1 had a viscosity of 5 cP or less and showed excellent retardancy. On the other hand, the flame retardant electrolyte solution according to Comparative Example 1 (including a lithium salt, a cyclic and linear carbonate-based mixed solvent, and an ionic solution including ammonium cations) and the flame retardant electrolyte solution according to Comparative Example 2 (including a lithium salt, a cyclic and linear carbonate-based mixed solvent, and a phosphoric acid-based solvent) each had a viscosity of 5 cP or less, but flame retardancy was deteriorated. In addition, the flame retardant electrolyte solution according to Comparative Example 3 and the flame retardant electrolyte solution according to Comparative Example 4 (both including a cyclic and linear carbonate-based mixed solvent) each had excellent flame retardancy, but each viscosity was out of the appropriate range.

Fabricating Rechargeable Lithium Cell

Each flame retardant electrolyte solution prepared according to Example 1 and Comparative Examples 1 through 4 was assembled into a rechargeable lithium cell as follows.

97 wt % of an artificial graphite negative active material and 3 wt % of a polyvinylidene fluoride binder were mixed to provide a mixture, and the mixture was dispersed in N-methyl-2-pyrrolidone to provide a negative active material slurry. The negative active material slurry was uniformly coated on a 20 μm-thick copper foil and dried to provide a negative electrode. Li metal was used as a counter electrode for the negative electrode. With the obtained negative electrode, the counter electrode, and the electrolyte solution, a half-cell was fabricated in accordance with the general method.

Experimental Example 3

Measuring Retardancy of Fully Charged Negative Electrode

Each negative electrode was fully charged at a 0.1 C condition to 10 mV with respect to the lithium electrode and the retardancy was measured. The fully charged negative electrode including the flame retardant electrolyte solution was directly contacted with a flame source, and whether or not it caught fire and the duration of the fire were observed to determine the retardancy of the fully charged negative electrode. The results are shown in Table 2, below.

Experimental Example 4

Measuring Charge and Discharge Characteristic of Lithium Rechargeable Cell

Each rechargeable lithium cell was measured to determine the electrochemical charge and discharge characteristics.

Each rechargeable lithium cell was charged and discharged once at 0.1 C to determine the electrochemical charge and discharge characteristics. The transformation efficiency was calculated as "discharge capacity at the first cycle/charge capacity at the first cycle)×100". The results are shown in Table 2, below.

In addition, each rechargeable lithium cell was charged and discharged at a 1 C rate and a 2 C rate, and the capacity retention was measured. The results are shown in Table 3, below.

Experimental Example 5

Analyzing DSC Graph of Fully Charged Negative Electrode

Figure 2:
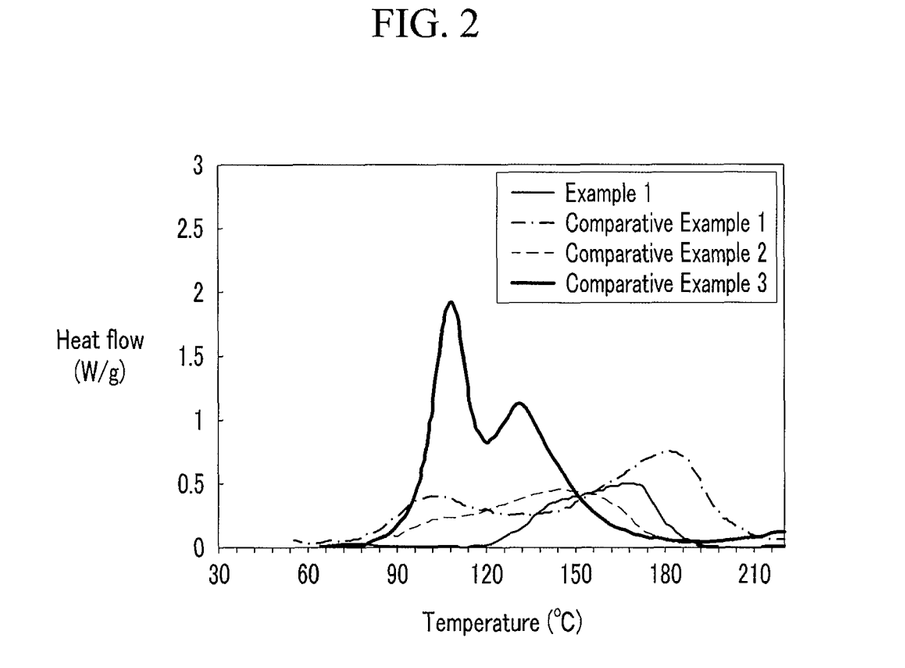
FIG. 2 is a graph comparing the differential scanning calorimetry (DSC) of fully charged negative electrodes prepared according to Example 1 to those prepared according to Comparative Examples 1 to 3.

FIG. 2 is a graph comparing the differential scanning calorimetry (DSC) of the fully charged negative electrodes obtained from the electrolytes of Example 1 and Comparative Examples 1 to 3. Referring to FIG. 2, the temperature initiating thermo-decomposition was 121° C. in Example 1, 64° C. in Comparative Example 1, 80° C. in Comparative Example 2, and 75° C. in Comparative Example 3. In addition, the caloric value was evaluated from the corresponding area of each graph. The caloric value was 190 J/g in Example 1, 280 J/g in Comparative Example 1, 210 J/g in Comparative Example 2, and 350 J/g in Comparative Example 3. From these results, it can be seen that the rechargeable lithium cell prepared with the electrolyte of Example 1 had a high temperature initiating thermo-decomposition and a low caloric value, thereby improving thermal stability.

TABLE 2

| | Retardancy of fully charged negative electrode | Charge capacity (mAh/g) | Discharge Capacity (mAh/g) | Formation Efficiency (%) |
|---|---|---|---|---|
| Ex. 1 | Very good | 360 | 337 | 94 |
| Comp. Ex. 1 | Severely bad | 377 | 351 | 93 |
| Comp. Ex. 2 | Good | 385 | 350 | 91 |
| Comp. Ex. 3 | Bad | 416 | 328 | 79 |
| Comp. Ex. 4 | Very good | 365 | 335.8 | 92 |

TABLE 3

| | Example 1 | Comparative Example 4 |
|---|---|---|
| Capacity retention (1C rate) (%) | 97.1 | 95 |
| Capacity retention (2C rate) (%) | 89.5 | 70.3 |

As shown in Table 2, the rechargeable lithium cell prepared with the electrolyte of Example 1 not only had excellent flame retardancy of the fully charged negative electrode, but also had excellent transformation efficiency. On the other hand, in the rechargeable lithium cells prepared with the electrolytes of Comparative Example 1 (including a lithium salt, a cyclic and linear carbonate-based mixed solvent, and an ionic solution including ammonium cations), Comparative Example 2 (including a lithium salt, a cyclic and linear carbonate-based mixed solvent, and a phosphoric acid-based solvent), Comparative Example 3 (including a lithium salt and a cyclic and linear carbonate-based mixed solvent), and Comparative Example 4 (including the same composition as Example 1 except that the solvent was a cyclic and linear carbonate-based mixed solvent), either the flame retardancy of the fully charged negative electrodes or the transformation efficiency were deteriorated.

In addition, as shown in Table 3, the lithium rechargeable cell prepared with the electrolyte of Example 1 (including a linear carbonate-based single solvent) had higher capacity retention than the cell prepared with the electrolyte of Comparative Example 4 (including a cyclic and linear carbonate-based mixed solvent).

While the present invention has been illustrated and described with reference to certain exemplary embodiments, it is understood by those of ordinary skill in the art that various modifications and changes may be made to the described embodiments without departing from the spirit and scope of the present invention as defined by the following claims.

What is claimed is:

1. An electrolyte for a rechargeable lithium battery, consisting of:
   at least one lithium salt;
   a linear carbonate-based solvent;
   an ionic solution comprising at least one ammonium cation and at least one anion;
   about 5 wt % to about 30 wt % of at least one phosphoric acid-based solvent selected from the group consisting of trimethyl phosphate (TMP), triethyl phosphate (TEP), tripropyl phosphate (TPP), tricresyl phosphate (TCP), trixylenyl phosphate (TXP), phosphonate compounds, phosphazene compounds, and mixtures thereof; and
   at least one oxalatoborate-based additive,
   wherein a wt % of the linear carbonate-based solvent present in the electrolyte is greater than a wt % of the ionic solution present in the electrolyte.

2. An electrolyte of claim 1, wherein the linear carbonate-based solvent is selected from the group consisting of dimethylcarbonate, diethylcarbonate, ethylmethylcarbonate, and mixtures thereof.

3. An electrolyte of claim 1, wherein the ammonium cation is selected from the group consisting of pyridium ions, pyradizinium ions, pyrimidinium ions, pyrazinium ions, imidazolium ions, pyrazolium ions, thiazolium ions, oxazolium ions, triazolium ions, and combinations thereof.

4. An electrolyte of claim 1, wherein the ammonium cation is selected from the group consisting of cations represented by Formulae 1 through 3, and combinations thereof:

(1)

wherein:
   each of $R_1$ and $R_2$ is independently selected from the group consisting of $C_1$ to $C_{30}$ alkyl groups substituted with at least one $C_1$ to $C_{30}$ alkoxy group, $C_1$ to $C_{30}$ alkyl groups substituted with at least one carboxyl group, unsubstituted $C_1$ to $C_{30}$ alkyl groups, $C_1$ to $C_{30}$ alkoxy groups substituted with at least one $C_1$ to $C_{30}$ alkoxy group, $C_1$ to $C_{30}$ alkoxy groups substituted with at least one carboxyl group, and unsubstituted $C_1$ to $C_{30}$ alkoxy groups;
   $R_3$ is selected from the group consisting of hydrogen, $C_1$ to $C_{30}$ alkyl groups substituted with at least one $C_1$ to C₃₀ alkoxy group, C₁ to C₃₀ alkyl groups substituted with at least one carboxyl group, and unsubstituted C₁ to C₃₀ alkyl groups;

n is a positive number from 1 to 4, wherein when n is 2 or greater, the $R_3$ groups are the same or different; and m is 0 or 1;

(2)

wherein:

each of $R_5$ and $R_6$ is independently selected from the group consisting of C₁ to C₃₀ alkyl groups substituted with at least one C₁ to C₃₀ alkoxy group, C₁ to C₃₀ alkyl groups substituted with at least one carboxyl group, unsubstituted C₁ to C₃₀ alkyl groups, C₁ to C₃₀ alkoxy groups substituted with at least one C₁ to C₃₀ alkoxy group, C₁ to C₃₀ alkoxy groups substituted with at least one carboxyl group, and unsubstituted C₁ to C₃₀ alkoxy groups;

$R_4$ is selected from the group consisting of hydrogen, C₁ to C₃₀ alkyl groups substituted with at least one C₁ to C₃₀ alkoxy group, C₁ to C₃₀ alkyl groups substituted with at least one carboxyl group, and unsubstituted C₁ to C₃₀ alkyl groups; and n is a positive number from 1 to 3, wherein when n is 2 or greater, the $R_4$ groups are the same or different; and

(3)

wherein:

each of $R_7$, $R_8$, $R_9$ and $R_{10}$ is independently selected from the group consisting of C₁ to C₃₀ alkyl groups substituted with at least one C₁ to C₃₀ alkoxy group, C₁ to C₃₀ alkyl groups substituted with at least one carboxyl group, unsubstituted C₁ to C₃₀ alkyl groups, C₁ to C₃₀ alkoxy groups substituted with at least one C₁ to C₃₀ alkoxy group, C₁ to C₃₀ alkoxy groups substituted with at least one carboxyl group, and unsubstituted C₁ to C₃₀ alkoxy groups.

5. An electrolyte of claim 1, wherein the ionic solution is present in the electrolyte in an amount ranging from about 20 to about 70 wt %.

6. An electrolyte of claim 1, wherein the anion is selected from the group consisting of $N(SO_2CH_3)_2^-$, $N(SO_2CF_2CF_3)_2^-$, $PF_6^-$, $BF_4^-$, anions represented by Formulae 4 and 5, and combinations thereof:

(4)

(5)

7. An electrolyte of claim 1, wherein the oxalatoborate-based additive is represented by Formula 6:

(6)

wherein each of $R_{11}$ and $R_{12}$ is independently selected from the group consisting of halogens, and halogenated C₁ to C₁₀ alkyl groups.

8. An electrolyte of claim 7, wherein the oxalatoborate-based additive is lithium difluorooxalatoborate.

9. An electrolyte of claim 1, wherein the oxalatoborate-based additive is lithium bisoxalatoborate.

10. An electrolyte of claim 1, wherein the oxalatoborate-based additive is present in an amount ranging from about 0.1 to 5 wt %.

11. An electrolyte for a rechargeable lithium battery, consisting of:

at least one lithium salt;

a linear carbonate-based solvent;

an ionic solution comprising at least one ammonium cation and at least one anion;

about 5 wt % to about 30 wt % of at least one phosphoric acid-based solvent selected from the group consisting of trimethyl phosphate (TMP), triethyl phosphate (TEP), tripropyl phosphate (TPP), tricresyl phosphate (TCP), trixylenyl phosphate (TXP), phosphonate compounds, phosphazene compounds, and mixtures thereof;

at least one oxalatoborate-based additive; and a fluorinated carbonate-based solvent, wherein a wt % of the linear carbonate-based solvent present in the electrolyte is greater than a wt % of the ionic solution present in the electrolyte.

12. An electrolyte of claim 11, wherein the fluorinated carbonate-based solvent is selected from the group consisting of fluoroethylene carbonate, difluoroethylene carbonate, fluorodimethyl carbonate, fluoroethylmethyl carbonate, and combinations thereof.

13. An electrolyte of claim 11, wherein the fluorinated carbonate-based solvent is present in an amount ranging from about 10 to about 50 wt %.

14. A rechargeable lithium battery, comprising:

a positive electrode;

a negative electrode;

a separator; and an electrolyte consisting of:

at least one lithium salt;

a linear carbonate-based solvent;

an ionic solution comprising at least one ammonium cation and at least one anion;

about 5 wt % to about 30 wt % of at least one phosphoric acid-based solvent selected from the group consisting of trimethyl phosphate (TMP), triethyl phosphate (TEP), tripropyl phosphate (TPP), tricresyl phosphate (TCP), trixylenyl phosphate (TXP), phosphonate compounds, phosphazene compounds, and mixtures thereof; and
an oxalatoborate-based additive,
wherein a wt % of the linear carbonate-based solvent present in the electrolyte is greater than a wt % of the ionic solution present in the electrolyte.

15. A battery of claim 14, further comprising a coating on the negative electrode, the coating comprising a polymer derived from the oxalatoborate-based additive.

16. A battery of claim 15, wherein the coating comprises a polymer represented by Chemical Formula 6A:

Chemical Formula 6A

17. A rechargeable lithium battery, comprising:
a positive electrode;
a negative electrode;
a separator; and
an electrolyte consisting of:
at least one lithium salt;
a linear carbonate-based solvent;
an ionic solution comprising at least one ammonium cation and at least one anion;
about 5 wt % to about 30 wt % of at least one phosphoric acid-based solvent selected from the group consisting of trimethyl phosphate (TMP), triethyl phosphate (TEP), tripropyl phosphate (TPP), tricresyl phosphate (TCP), trixylenyl phosphate (TXP), phosphonate compounds, phosphazene compounds, and mixtures thereof;
an oxalatoborate-based additive; and
a fluorinated carbonate-based solvent,
wherein a wt % of the linear carbonate-based solvent present in the electrolyte is greater than a wt % of the ionic solution present in the electrolyte.

18. A battery of claim 17, further comprising a coating on the negative electrode, the coating comprising a material selected from the group consisting of LiF, a polymer derived from the oxalatoborate-based additive, and combinations thereof.

19. A battery of claim 14, wherein the negative electrode comprises a coating comprising a material selected from the group consisting of LiF, a polymer derived from the oxalatoborate-based additive, and combinations thereof.

20. A battery of claim 19, wherein the coating of the negative electrode comprises an oxalato-borate based polymer represented by Chemical Formula 6A:

Chemical Formula 6A

* * * * *